(12) United States Patent
Wilson

(10) Patent No.: US 10,919,451 B2
(45) Date of Patent: *Feb. 16, 2021

(54) TUNED MASS DAMPER IN AN EXTERIOR REARVIEW DEVICE

(71) Applicant: SMR Patents S.à.r.l., Luxembourg (LU)

(72) Inventor: Douglas Wilson, Troy, MI (US)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,144

(22) Filed: Apr. 4, 2019

(65) Prior Publication Data

US 2019/0232872 A1    Aug. 1, 2019

Related U.S. Application Data

(63) Continuation-in-part of application No. 15/442,143, filed on Feb. 24, 2017, now Pat. No. 10,266,120.

(51) Int. Cl.
*A47F 1/14* (2006.01)
*B60R 1/06* (2006.01)
(Continued)

(52) U.S. Cl.
CPC ............ *B60R 1/06* (2013.01); *B60R 11/0229* (2013.01); *B60R 11/04* (2013.01); *F16F 7/116* (2013.01);
(Continued)

(58) Field of Classification Search
CPC ... G02B 26/08; B60R 1/12; B60R 1/06; F16F 7/104

See application file for complete search history.

(56) References Cited

U.S. PATENT DOCUMENTS 3,347,513 A    10/1967  Liedel
4,234,153 A *  11/1980  Chihara .................. B60R 1/076
                                                      248/475.1
(Continued)

FOREIGN PATENT DOCUMENTS

DE    102014116799        3/1916
DE        4200744          7/1993
(Continued)

OTHER PUBLICATIONS

German Office Action dated Mar. 18, 2020 of German application No. 10 2018 103 761.9.

*Primary Examiner* — Amy J. Sterling
(74) *Attorney, Agent, or Firm* — Jones Day

(57) ABSTRACT

A motor vehicle includes mating features in a sheet metal of the motor vehicle, an exterior rearview device assembly fixedly secured to the motor vehicle, where the exterior rearview device assembly includes a structural base frame that mates to the mating features of the sheet metal at a mounting plane, and a tuned mass damper secured to the structural base frame adjacent to the mounting plane. In an example, a primary axis of movement of the tuned mass damper is at least one of substantially parallel with or substantially perpendicular to the mounting plane. In another example, the tuned mass damper is configured to dampen resonant vibrations being generated by the motor vehicle.

20 Claims, 4 Drawing Sheets

(51) Int. Cl.
*B60R 11/04* (2006.01)
*F16F 7/116* (2006.01)
*B60R 11/02* (2006.01)
B60R 11/00 (2006.01)

(52) U.S. Cl.
CPC ..... *B60R 2011/004* (2013.01); *F16F 2222/08* (2013.01)

(56) References Cited

U.S. PATENT DOCUMENTS

| | | | |
|---|---|---|---|
| 4,601,554 A * | 7/1986 | Plante | G02B 26/0825 359/849 |
| 4,804,257 A | 2/1989 | Schmidt | |
| 4,998,814 A | 3/1991 | Perry | |
| 5,143,342 A | 9/1992 | Schmidt | |
| 7,137,715 B2 * | 11/2006 | Schuurmans | B60R 1/06 359/841 |
| 8,517,547 B2 | 8/2013 | Herrmann et al. | |
| 2005/0213229 A1 | 9/2005 | Cofer et al. | |
| 2009/0073589 A1 | 3/2009 | Mendoza et al. | |

FOREIGN PATENT DOCUMENTS

| | | |
|---|---|---|
| DE | 19701480 | 7/1998 |
| DE | 19803459 | 9/1999 |
| DE | 10138478 | 2/2003 |
| DE | 10143976 | 4/2003 |
| DE | 102005055849 | 5/2007 |
| EP | 0538608 A1 | 9/1992 |
| EP | 0794087 | 9/1997 |
| FR | 2887494 A1 | 12/2006 |
| FR | 2906201 | 3/2008 |
| FR | 2978392 A1 | 7/2011 |
| WO | WO 2009/103117 | 8/2009 |

* cited by examiner

A-A

TUNED MASS DAMPER IN AN EXTERIOR REARVIEW DEVICE

CROSS-REFERENCE TO RELATED APPLICATION

This application is a continuation-in-part of U.S. patent application Ser. No. 15/442,143, filed Feb. 24, 2017, which is hereby incorporated by reference in its entirety for all purposes.

BACKGROUND OF THE INVENTION

1. Field of the Invention

The following description relates to exterior rearview devices such as a rearview camera pod or a rearview mirror that includes a tuned mass damping system, and vehicles including such exterior rearview devices.

2. Related Art

Functional performance of a product is essential to customer satisfaction. With respect to exterior rearview devices attached to automobiles, one of the most significant factors of customer satisfaction is the stability of the image that the driver sees in the device as he is checking for objects in his device. This is known as "On Road Vibration Performance" of the device (hereinafter "ORVP"). It is well known that all items have a frequency with which they resonate. With exterior rearview devices it is common knowledge that the higher the resonant frequency of the device, the better the ORVP. It is also common knowledge that the resonant frequency of a device is usually different in the vertical axis compared to the fore/aft axis and the in/out axis.

With all exterior rearview devices, and especially larger exterior rearview devices, the mass of the rearview device may be great and the center of gravity may be outboard. It is also well known that as the mass of an object increases, the resonant frequency decreases. This makes it more difficult to achieve acceptable ORVP on larger exterior rearview devices. In addition, with camera pods and devices which use digital image capturing means to capture a rearview image of the vehicle, stability is even more essential in order to capture a clear digital image.

Another challenge associated with achieving good ORVP with rearview devices, especially in larger vehicles, is the fact that the vehicle itself generates a wide range of resonant vibrations from items such as the engine, tire treads contacting the road surface, stiff high load suspensions, vibrations of the hood or floor-pan, or other larger sheet metal bodies. These resonant vibrations migrate to the rearview device mounting structure of the vehicle door. These resonant vibrations that present themselves in the rearview device mounting structure have a variety of frequencies and amplitudes which all feed into the rearview device structure and ultimately to the rearview device reflective surface. These vibration inputs from the vehicle then combine with the oscillations of the rearview device that are present due to inherent structural characteristics of the exterior rearview device itself and can result in poorer ORVP than desired.

Mass damping is known and mass dampers are commercially available. A typical mass damper includes a structurally rigid mounting plate, a block of material which constitutes the mass, and one or more flexible members that connect the mass with the mounting structure. A mass damper can be designed to specifically have the same resonant frequency regardless of which direction it is checked, while other mass dampers are designed to be more flexible in certain directions and less flexible in other directions resulting in different resonant frequencies in each axis. Previous applications of mass damping in an exterior rearview device involved mounting a mass damper close to the connection point of the reflective element, the display of the rearview device, the camera pod, and/or the structural member of the case. The results of mass damping at these points were not favorable as the added mass of the mass damper would increase the overall mass of the rearview device, and also move the rearview device's center of gravity outboard and in doing so, decrease the base resonant frequency of the rearview device head.

SUMMARY

In one aspect, a motor vehicle includes a mating features in a sheet metal of the motor vehicle, and an exterior rearview device fixedly secured to the motor vehicle, the exterior rearview device including a structural base frame that mates to the mating features of the sheet metal at a mounting plane, and a tuned mass damper secured to the structural base frame adjacent to the mounting plane, where a primary axis of movement of the tuned mass damper is at least one of substantially parallel with or substantially perpendicular to the mounting plane.

The tuned mass damper may be configured to dampen resonant vibrations being generated by the motor vehicle.

The tuned mass damper may be positioned between 2 millimeters to 10 millimeters away from the mounting plane.

The tuned mass damper may be positioned inboard or on a side of a motor vehicle door that is closer to the exterior rearview device.

The tuned mass damper may include a mass, a mounting shaft that is secured to the structural base frame and extends through the mass, and at least one spring.

The at least one spring may include a first spring and a second spring, and the mass may be flanked by the first spring on a side and the second spring on another side.

The tuned mass damper may include a mass, a first attaching element and a second attaching element, and at least one shaft formed of flexible material.

The at least one shaft formed of flexible material may include a first shaft and a second shaft, and the mass is flanked by the first shaft on a side and the second shaft on another side.

The primary axis of movement of the tuned mass damper may be substantially parallel with the mounting plane.

The primary axis of movement of the tuned mass damper may be substantially perpendicular to the mounting plane.

The exterior rearview device may include at least one of an exterior rearview mirror, an exterior side-view mirror, a camera pod, and a display.

In another aspect, a motor vehicle may include a mating features in a sheet metal of the motor vehicle, and an exterior rearview device fixedly secured to the motor vehicle, the exterior rearview device including a structural base frame that mates to the mating features of the sheet metal at a mounting plane, and a tuned mass damper secured to the structural base frame adjacent to the mounting plane, where the tuned mass damper is configured to dampen resonant vibrations being generated by the motor vehicle.

The tuned mass damper may be positioned between 2 millimeters to 10 millimeters away from the mounting plane.

The tuned mass damper may be positioned inboard or on a side of a motor vehicle door that is closer to the exterior rearview device.

The tuned mass damper may include a mass, a mounting shaft that is secured to the structural base frame and extends through the mass, and at least one spring.

The at least one spring may include a first spring and a second spring, and the mass may be flanked by the first spring on a side and the second spring on another side.

The tuned mass damper may include a mass, a first attaching element and a second attaching element, and at least one shaft formed of flexible material.

The at least one shaft may be formed of flexible material including a first shaft and a second shaft, and the mass may be flanked by the first shaft on a side and the second shaft on another side.

A primary axis of movement of the tuned mass damper may be at least one of substantially parallel with or substantially perpendicular to the mounting plane.

The primary axis of movement of the tuned mass damper may be substantially parallel with the mounting plane.

The primary axis of movement of the tuned mass damper may be substantially perpendicular to the mounting plane.

The exterior rearview device may include at least one of an exterior rearview mirror, an exterior side-view mirror, a camera pod, and a rearview display.

DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION OF THE INVENTION

Figure 1:
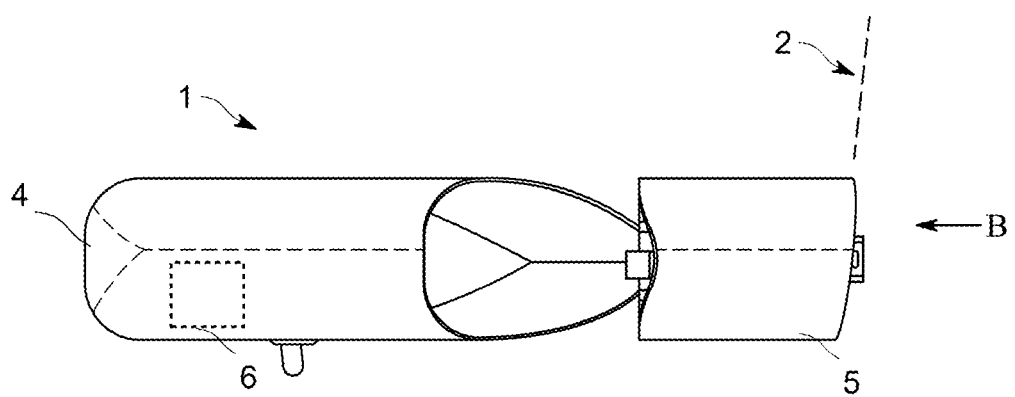
FIG. 1 is a front perspective view of an example of a conventional camera pod and a viewing side B.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," "corner," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

FIG. 1 is a front perspective view of a conventional camera pod 1 and a viewing side B. Referring to FIG. 1, a conventional camera pod 1 is attached to a vehicle 2 and is attached at a rearview device mounting plane of the vehicle door 2.

It should be appreciated that the camera pod 1 is a type of exterior rearview device and may be referred to interchangeably as the rearview device 1. In this example, the camera pod 1 may include one or more cameras 6 and may include a pivot joint between a case assembly 4 and a base assembly 5. The pivot joint may have any of a number of configurations to allow the case assembly 4 to pivot with respect to the base assembly 5.

Other examples of the rearview device 1 may include an exterior rearview or side-view mirror, a rearview or side-view display, a camera/display system, and/or any reflective or non-reflective element which provides a view of the rear or side of a vehicle. U.S. patent application Ser. No. 15/442,143, which is incorporated by reference herein for all purposes, describes an exterior rearview device which is a rearview mirror. For convenience and ease of illustration, the rearview device 1 is illustrated as a camera pod 1. It should be appreciated that the following description is applicable to any example of a rearview device 1 although a camera pod 1 is illustrated.

The rearview device 1 includes the rearview device base assembly 5 having a base frame and a base cover. The rearview device 1 also include the rearview device case assembly 4 having, among other things, a rearview device case and a case frame. In an example, a rearview device 1 may include one or more of a camera 6, a display, or a reflective element such as a mirror. In the examples described below and illustrated in FIGS. 3 and 4, a tuned mass damper assembly 12, 14 is shown secured to the base frame at a position adjacent to a rearview device mounting plane.

Figure 2:
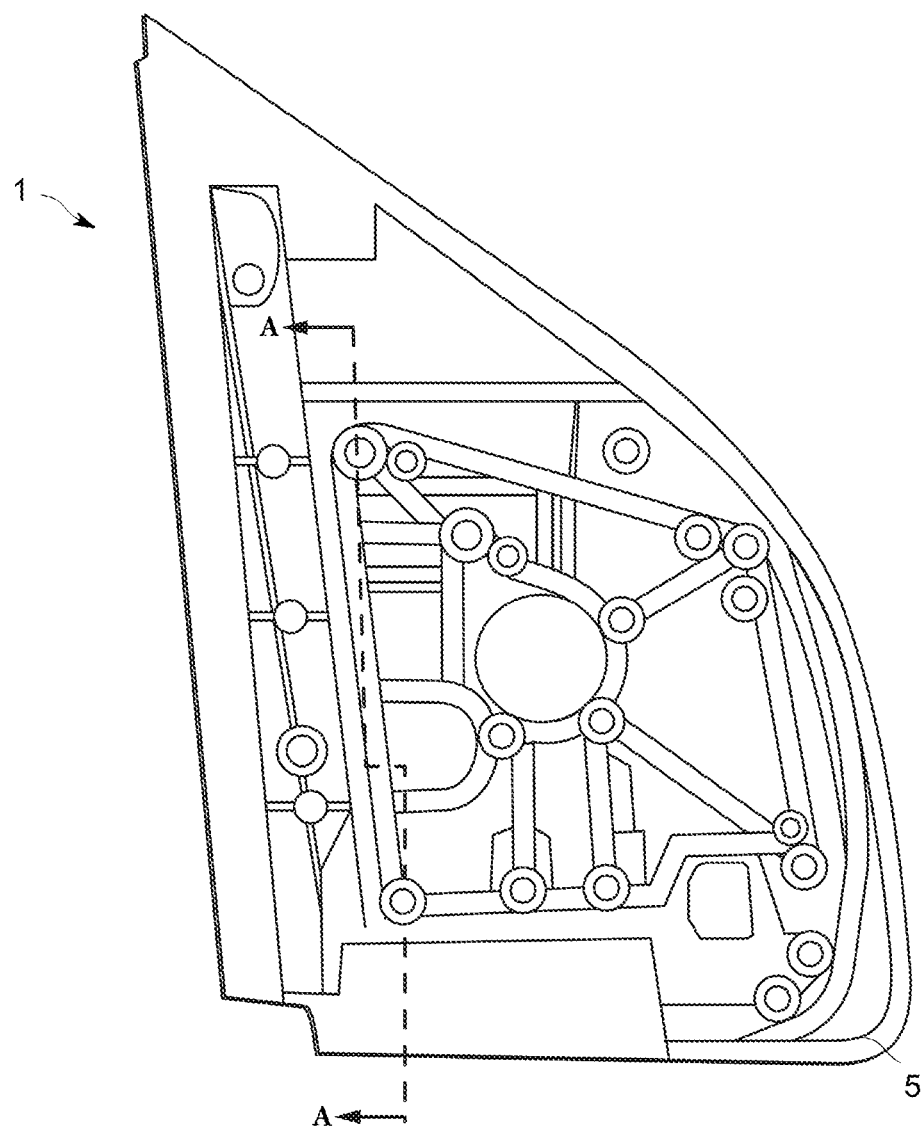
FIG. 2 is a planar view of an example of the conventional camera pod of FIG. 1 as viewed from viewing side B, and including an axis A-A.

FIG. 2 is a planar view of the conventional rearview device 1 of FIG. 1 as viewed from viewing side B, and including an axis A-A.

Referring to FIG. 2, the base assembly 5 of the conventional rearview device 1 does not include a mass damper assembly at the base frame. Typically, a mass damper assembly is mounted close to the connection point of the reflective element, rearview camera, rearview display, and/or the structural member of the case.

Figure 3:
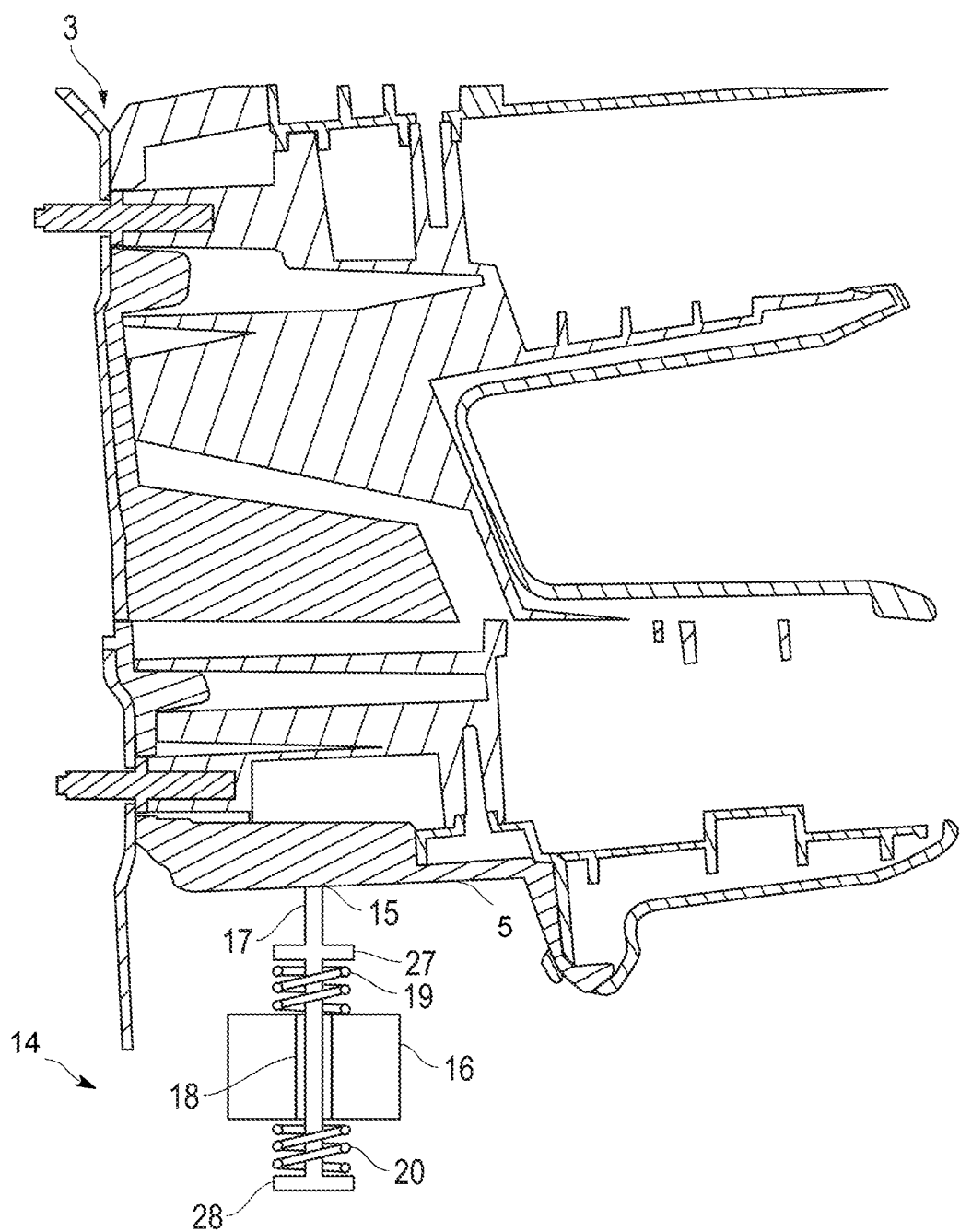
FIG. 3 is a cross-sectional view of a camera pod along the axis A-A of FIG. 2 including an example of a mass damping system according to the invention.

FIG. 3 is a cross-sectional view of a rearview device 1 along the axis A-A of FIG. 2 including a first example of a mass damping system 14 according to the invention.

Referring to FIG. 3, one embodiment of a tuned mass damper assembly 14 is illustrated, which is secured to the rearview device base assembly 5 adjacent to a mounting plane 3. In this example, the mass 16 includes a solid block of heavy material, such as steel, aluminum, lead or some other material. The mass 16 is not limited to a solid block but may include any solid structure, any structure with holes, openings, or slots, and any structure with an abstract shape. Examples of other materials include polymers, ceramics, and any high-gravity compound (HGC) material which may, but does not have to, include a filler. Also included is the mounting shaft 17 which is secured to the base frame at position 15 on one end. The other end of the mounting shaft 17 extends through a hole 18 in the center of the mass 16. The mass 16 is held in position by springs 19 and 20. Spring 19 has one end abutting a flange 27 on the upper end of mounting shaft 17 while the other end abuts the upper side of mass 16. Likewise, spring 20 has one end abutting with a flange 28 on the lower end of the mounting shaft 17 while the other end of spring 20 abuts with the lower side of mass 16. In this manner, the mass 16 is allowed to move along the axis of the mounting shaft 17 when the force applied is greater that the resultant forces of the springs 19 and 20 that hold the mass 16 in position.

Figure 4:
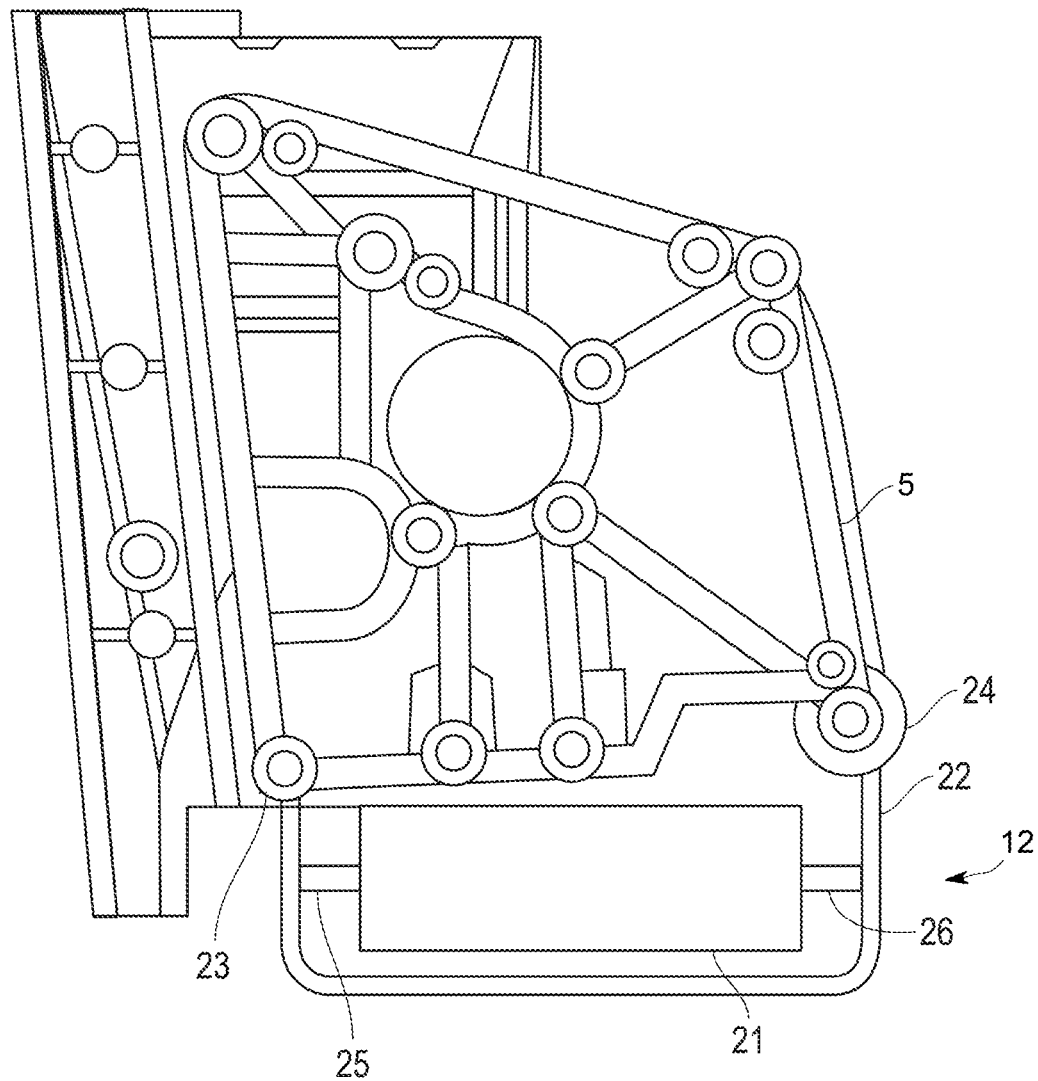
FIG. 4 is a planar view of the conventional camera pod of FIG. 1 as viewed from viewing side B, and including another example of a mass damping system according to the invention.

FIG. 4 is a planar view of a rear-view device as viewed from viewing side B of FIG. 1, and including another example of a mass damping system 12 according to the invention.

Referring to FIG. 4, another embodiment of a tuned mass damper assembly 12 is illustrated, in which the mass 21 includes a solid block of heavy material, such as steel, aluminum, lead or some other similar material. Also included is a mounting plate 22 which is secured to the base assembly 5 at a first position 23 and a second position 24. Mass 21 is secured to mounting plate 22 using two flexible members 25 and 26. Mass damping is achieved in this embodiment because flexible members 25 and 26 allow the mass 21 to resonate in response to vibration inputs transmitted through the vehicle.

In an aspect of the above described embodiments and descriptions, a tuned mass damper 12, 14 is secured to the rearview device base adjacent to a mounting plane 3. If packaging space permits, this can be mounted into the structure of the base frame proper. The mass damper 12, 14 may be designed to have a greater degree of flexibility in the axis that has the greatest amount of resonant vibration, or energy input as produced by the vehicle. In this sense, as described, the mass damper is considered "tuned". With the mass damper located as close as possible to the mounting plane 3 of the exterior rearview device, it does not increase the amount of suspended mass at the outboard end of the rearview device. This moves the relative rearview device center of gravity inboard and thus does not decrease the resonant frequency of the rearview device. By being located inboard of and adjacent to the rearview device mounting plane 3 of the door, the mass damper has the effect of smoothing out the resonant vibrations that are produced by the vehicle that would otherwise be input directly to the rearview device. By smoothing out the vibration inputs into the rearview device, the ORVP of the rearview device is significantly improved.

In an aspect, adjacent to the rearview device mounting plane 3 is preferably within a range of about 2 to about 10 millimeters from the rearview device mounting plane 3; however, this range is not limited thereto. For example, the range includes at least 2 millimeters, at least 3 millimeters, at least 4 millimeters, at least 5 millimeters, at least 6 millimeters, at least 7 millimeters, at least 8 millimeters, at least 9 millimeters, at least 10 millimeters, at most 2 millimeters, at most 3 millimeters, at most 4 millimeters, at most 5 millimeters, at most 6 millimeters, at most 7 millimeters, at most 8 millimeters, at most 9 millimeters, and at most 10 millimeters from the rearview device mounting plane. In a further example, a range from about 0 to about 50 millimeters from the mounting plane 3 is also described.

The apparatus of the present invention has been described above and in the attached drawings; however, modifications will be apparent to those of ordinary skill in the art and the scope of protection for the invention is to be defined by the claims that follow.

The invention claimed is:

1. A motor vehicle, comprising:
   mating features in a sheet metal of the motor vehicle; and
   an exterior rearview device fixedly secured to the motor vehicle, the exterior rearview device comprising
      a structural base frame that mates to the mating features of the sheet metal at a mounting plane; and
      a tuned mass damper secured to the structural base frame adjacent to the mounting plane,
   wherein a primary axis of movement of the tuned mass damper is at least one of substantially parallel with or substantially perpendicular to the mounting plane.

2. The motor vehicle of claim 1, wherein the tuned mass damper is configured to dampen resonant vibrations being generated by the motor vehicle.

3. The motor vehicle of claim 1, wherein the tuned mass damper is positioned between 2 millimeters to 10 millimeters away from the mounting plane.

4. The motor vehicle of claim 1, wherein the tuned mass damper is positioned inboard or on a side of a motor vehicle door that is closer to the exterior rearview device.

5. The motor vehicle of claim 1, wherein the tuned mass damper comprises
   a mass;
   a mounting shaft that is secured to the structural base frame and extends through the mass; and
   at least one spring.

6. The motor vehicle of claim 5, wherein the at least one spring comprises a first spring and a second spring, and the mass is flanked by the first spring on a side and the second spring on another side.

7. The motor vehicle of claim 1, wherein the tuned mass damper comprises
   a mass;
   a first attaching element and a second attaching element; and
   at least one shaft formed of flexible material.

8. The motor vehicle of claim 7, wherein the at least one shaft formed of flexible material comprises a first shaft and a second shaft, and the mass is flanked by the first shaft on a side and the second shaft on another side.

9. The motor vehicle of claim 1, wherein the primary axis of movement of the tuned mass damper is substantially perpendicular to the mounting plane.

10. The motor vehicle of claim 1, wherein the exterior rearview device comprises at least one of an exterior rearview mirror, an exterior side-view mirror, a camera pod, and a display.

11. A motor vehicle, comprising:
mating features in a sheet metal of the motor vehicle; and
an exterior rearview device fixedly secured to the motor vehicle, the exterior rearview device comprising
    a structural base frame that mates to the mating features of the sheet metal at a mounting plane; and
    a tuned mass damper secured to the structural base frame adjacent to the mounting plane,
wherein the tuned mass damper is configured to dampen resonant vibrations being generated by the motor vehicle.

12. The motor vehicle of claim 11, wherein the tuned mass damper is positioned between 2 millimeters to 10 millimeters away from the mounting plane.

13. The motor vehicle of claim 11, wherein the tuned mass damper is positioned inboard or on a side of a motor vehicle door that is closer to the exterior rearview device.

14. The motor vehicle of claim 11, wherein the tuned mass damper comprises
a mass;
a mounting shaft that is secured to the structural base frame and extends through the mass; and
at least one spring.

15. The motor vehicle of claim 14, wherein the at least one spring comprises a first spring and a second spring, and the mass is flanked by the first spring on a side and the second spring on another side.

16. The motor vehicle of claim 11, wherein the tuned mass damper comprises
a mass;
a first attaching element and a second attaching element; and
at least one shaft formed of flexible material.

17. The motor vehicle of claim 16, wherein the at least one shaft formed of flexible material comprises a first shaft and a second shaft, and the mass is flanked by the first shaft on a side and the second shaft on another side.

18. The motor vehicle of claim 11, wherein a primary axis of movement of the tuned mass damper is at least one of substantially parallel with or substantially perpendicular to the mounting plane.

19. The motor vehicle of claim 18, wherein the primary axis of movement of the tuned mass damper is substantially perpendicular to the mounting plane.

20. The motor vehicle of claim 11, wherein the exterior rearview device comprises at least one of an exterior rearview mirror, an exterior side-view mirror, a camera pod, and a rearview display.

* * * * *